Aug. 25, 1931. W. J. HAMMERS Re. 18,160

ELECTRIC WATER HEATER

Original Filed Aug. 23, 1926

Inventor
William J. Hammers
By Livingston and Van Antwerp
Attorneys

Reissued Aug. 25, 1931

Re. 18,160

UNITED STATES PATENT OFFICE

WILLIAM J. HAMMERS, OF GRAND RAPIDS, MICHIGAN

ELECTRIC WATER HEATER

Original No. 1,656,518, dated January 17, 1928, Serial No. 130,877, filed August 23, 1926. Application for reissue filed January 14, 1930. Serial No. 420,780.

This invention relates to an electric water heater. It is an object and purpose of the present invention to provide a heater for water wherein heat may be supplied to the water through an electric agency wherein a short circuited secondary winding has electric currents induced therein by reason of its proximity, location and coupling with respect to primary windings and the cores around which they are located and by reason of the current induced, said secondary short circuited winding is heated to a high degree of temperature. Through this short circuited winding the water circulates and absorbs the heat thus produced whereby the water is heated to high temperature.

A further object of the invention is to provide a construction of this character which is of relatively simple, compact and durable structure and one which may be very easily and readily installed in connection with the usual and well known vertical water tank largely used for hot water heating purposes. For an understanding of the invention reference may be had to the following description taken in connection with the accompanying drawings, in which Fig. 1 is a side elevation of a water tank equipped with the heating unit of my invention.

Like reference characters refer to like parts in the different figures of the drawings.

Figure 2:
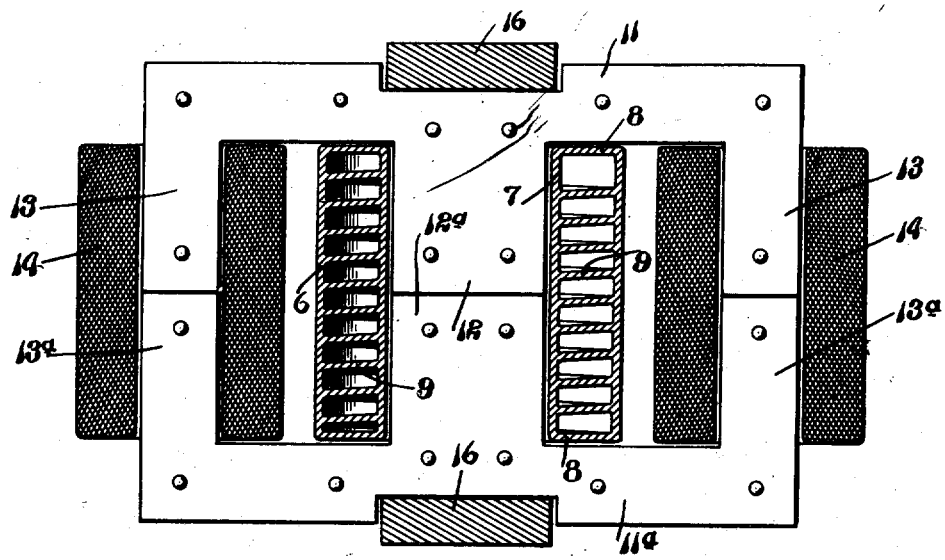
Fig. 2 is an enlarged vertical section through the heating unit.
Figure 3:
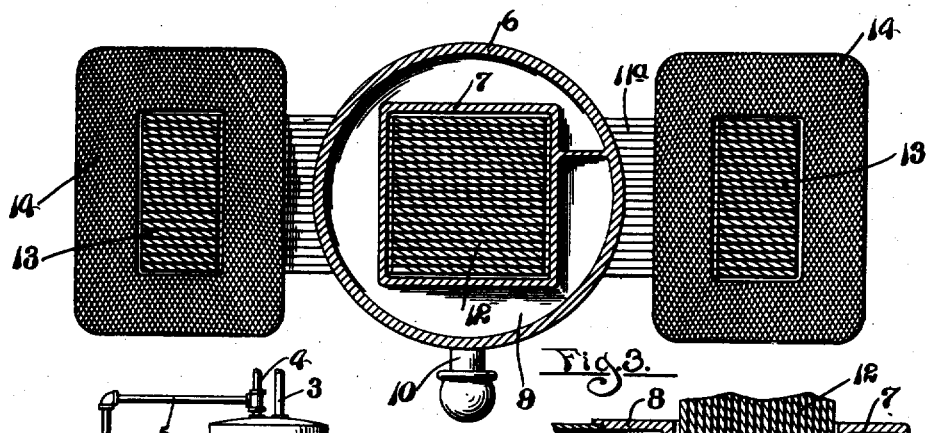
Fig. 3 is an enlarged horizontal section therethrough.
Figure 1:
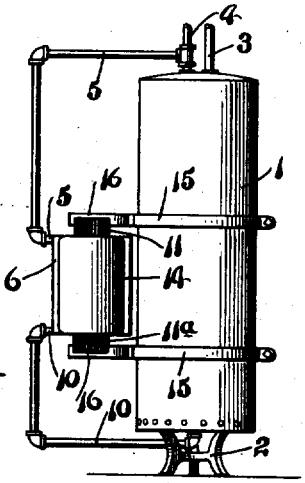
Figure 4:
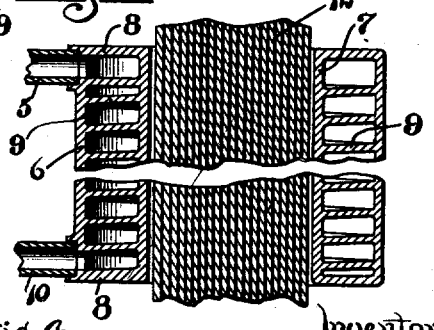
Fig. 4 is a fragmentary enlarged vertical section through the central portion of the heating unit, the plane of the section being at right angles to the plane of the section shown in Fig. 2.

The tank 1 for holding the hot water is of usual construction and is supported by the usual standard 2 at its lower end. It is equipped with an inlet pipe 3 at its upper end and also with an outlet pipe 4 through which the water may be drawn from the tank.

A pipe 5 branches laterally from the outlet pipe 4 and leads to and connects with a cylinder 6 at the upper end thereof. Integrally cast with the vertical cylinder 6 is an inner vertical wall 7 substantially square in cross section, the upper ends of the wall 7 and cylinder 6 being connected by integrally cast upper and lower ends 8 thereby making closed receptacle. Between the wall 7 and the cylinder 6 a spiral partition 9 is located and is cast integral therewith, the same being of a form such that water entered at one end of the cylinder 6 follows the partition around the inner wall 7 several times before reaching the opposite end. A pipe 10 is connected at one end at the lower end of the outer cylinder 6 and at its opposite end is connected with the bottom of the tank 1. As will hereafter be described the water is heated in the receptacle made by the cylinder 6, with inner wall 7 and closed ends 8, circulating through the same as impelled by the spiral partition 9, the water passing from the lower end of the tank 1 upwardly through the pipe 10, thence upwardly as guided by the spiral partition 9 to the upper pipe 5 and thence to the upper end of the tank 1 so that water drawn outwardly through the outlet pipe 4 will be of the highest temperature that any portion of the water in the tank has attained.

Across the upper end of the water heating receptacle a section of a core 11 is placed. This core is made of a plurality of laminations riveted or otherwise securely fastened together and depending from which is a central leg 12 and two end legs 13. The leg 12 passes into the upper end of the space surrounded by the wall 7 and extends substantially half way therethrough. A similar core 11*a* made up of a plurality of laminations is located across the lower end of the water heating receptacle and similarly has a central upwardly extending leg 12*a* and two end legs 13*a*, the leg 12*a* extending into the lower end of the space surrounded by the wall 7 and at its upper end abutting against the lower end of the leg 12, while the legs 13*a* abut at their upper ends against the lower ends of the legs 13, as best shown in Fig. 2. Around those portions of the core formed of the abutting legs 13 and 13*a* coils 14 are placed. These coils may be considered primary coils and through them an alternating electric current is designed to be passed. The coils are spaced a short distance from the outer sides of the cylinder 6.

Two clamping rings 15 are located around the tank 1 in spaced apart relation, each at one side carrying an outwardly extending arm 16, the upper one of which seats in a recess cut in the upper side of the core 11 while the lower seats in a corresponding recess cut in the lower side of the core 11*a*. By this means the two core sections are maintained in fixed relation with respect to each other and to the water heating receptacle and serve also to help support the unit.

Electric current passed through the coils 14 induces current in the heating receptacle comprised of the cylinder 6 with the inner wall 7, ends 8 and the partitions 9. Such induced currents are of high amperage and by reason of the integral structure of this water heating receptacle are short circuited so that the same flow through short circuits thereby causing the production of a considerable heat in the water heating member described. This heat is transmitted to the water which is within the same and as the temperature of the water increases it flows upwardly directed and guided by the partition 9, passing outwardly through the pipe 5 and being replaced by fresh colder water coming into the heating unit through the pipe 10 from the lower end of the tank.

The construction is relatively simple, practical and durable and efficient in service. It has been constructed and thoroughly tried and tested and with it water may be heated with a minimum of consumption of electric current and a consequent minimum of cost. The invention is defined in the appended claims and is to be considered comprehensive of all forms of structure coming within their scope.

I claim:

1. In combination, a water heating member formed with an outer shell, an inner hollow wall, and integral ends connecting the ends of said shell and wall, an inlet and an outlet at the respective ends of said water heating member, a core located around said water heating member having a middle vertical portion passing through said hollow wall and two end vertical portions parallel with and spaced from the sides of the outer shell, and primary coil windings around said end vertical portions of the core.

2. A water heater comprising a receptacle having an outer shell, an inner hollow wall extending through and spaced from the shell and integral ends connecting the ends of the wall and shell, an open laminated core having a portion extending through the hollow inner wall of the receptacle, a second portion located parallel to and outside of the shell, and connecting portions between the said first named portions, and a primary coil winding around said second portion of the core, substantially as described.

3. A construction containing the elements in combination defined in claim 2, combined with an inlet pipe leading into one end of said receptacle, an outlet pipe leading from the other end thereof, and an integral spiral partition located between the shell and inner wall leading from one pipe to the other.

4. In combination, a vertical water heating member comprising, an outer shell, an inner hollow vertical wall extending through said shell and ends integral with and connecting the ends of the shell and wall, an inlet and an outlet at the respective ends of said member, a spiral partition between the said shell and wall leading from one of said openings to the other, a core formed of two sections, one located over the upper end of said member and the other located under the lower end thereof, said cores having intermediate legs projecting toward each other through the opening surrounded by said inner wall, and end legs extending toward each other at opposite outer sides of the said shell and primary coil windings around said end legs of the sections of the core spaced a short distance from the adjacent sides of said outer shell.

5. A construction containing the elements in combination defined in claim 4, combined with a tank located adjacent said water heating member and members attached to the tank and extending one over the upper section of the core and the other under the lower section thereof to thereby support said core sections and hold the same together.

6. A heater comprising a vertically positioned primary coil in an electric circuit, a vertically positioned secondary coil associated therewith to receive an induced electric circuit from said primary coil, said secondary coil comprising a continuous conduit having inlet and outlet openings at its lower and upper ends respectively and consisting of a plurality of turns, each turn being electrically short circuited, and a conduit connecting the ends of the secondary coil, said secondary coil and conduit having a liquid of high heat receiving capacity therein.

7. In combination, a water heating member formed of a hollow element extending in a loop portion, said loop portion having one end slightly lower than the other end, a laminated core located around said water heating member, said core having a vertical portion passing through said loop portion and another vertical portion spaced from the said first vertical portion, horizontal portions connecting the respective ends of the vertical portions, a primary coil winding around the second mentioned vertical portion and means extending across the said loop portion to short circuit the same.

8. A heater of the class described comprising a core of loop construction, a primary coil located around the core immediately adjacent thereto, a secondary coil unit encircling the core at a point spaced from the primary coil, said secondary coil unit comprising a fluid conduit extending around the core, means to short circuit the fluid conduit and means to supply the conduit with fluid.

In testimony whereof I affix my signature.

WILLIAM J. HAMMERS.